T. G. NORLAND.
SMOKING AND DRYING APPARATUS FOR FISH OR THE LIKE.
APPLICATION FILED JAN. 26, 1920.
1,344,350.
Patented June 22, 1920.
3 SHEETS—SHEET 1.
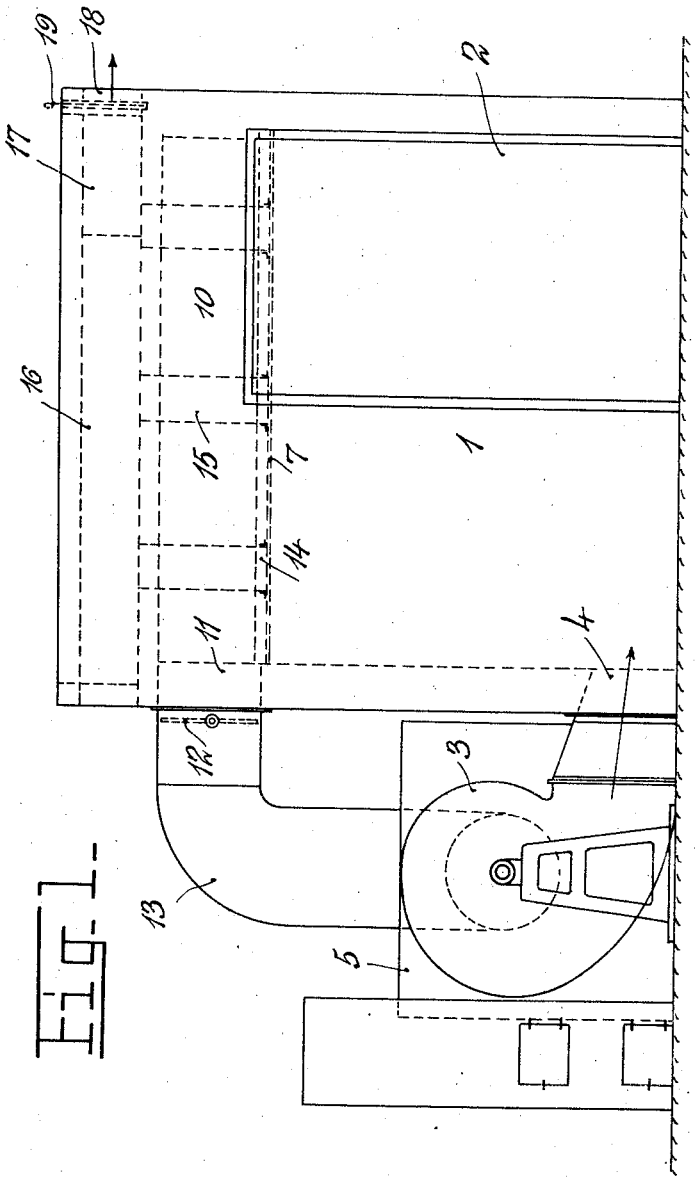
Inventor:
Torvald Gitlesen Norland
By Lawrence Langner
Attorney.

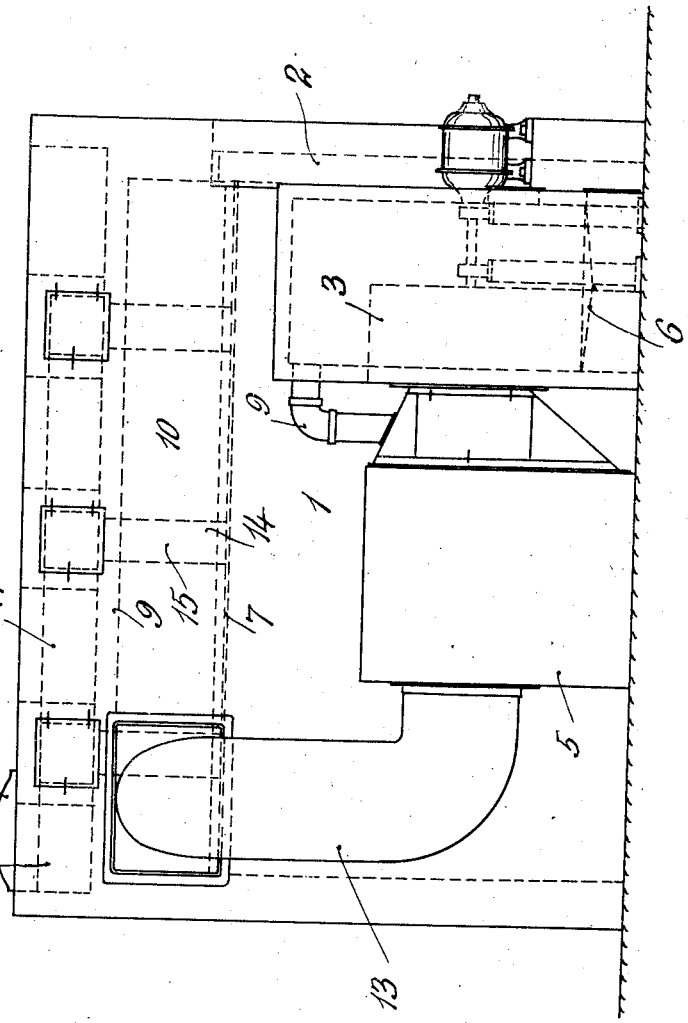

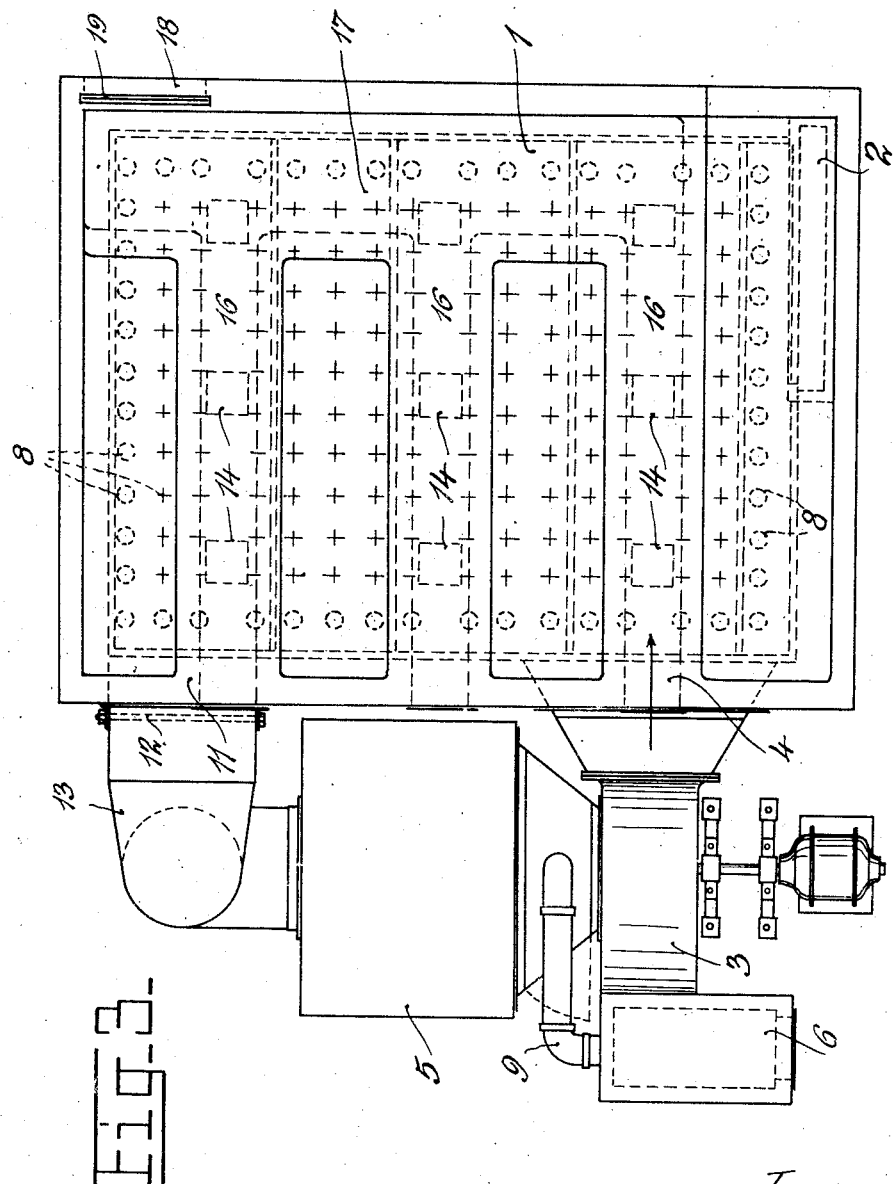

UNITED STATES PATENT OFFICE.

TORVALD GITLESEN NORLAND, OF STAVANGER, NORWAY.

SMOKING AND DRYING APPARATUS FOR FISH OR THE LIKE.

1,344,350.   Specification of Letters Patent.   Patented June 22, 1920.

Application filed January 26, 1920. Serial No. 354,115.

*To all whom it may concern:*

Be it known that I, TORVALD GITLESEN NORLAND, a subject of the King of Norway, residing at Stavanger, Norway, have invented certain new and useful Improvements in Smoking and Drying Apparatus for Fish or the like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object an apparatus or plant for drying and smoking fish or the like, said arrangement being adapted for smoking as well as for drying fish simultaneously or alternately.

On the drawing is diagrammatically illustrated an embodiment of the invention. Figure 1 is a front view of the apparatus, Fig. 2 is a side view of the same and Fig. 3 is a plan.

1 is the drying chamber, which is provided with door 2 for introducing the goods to be dried. 3 is a fan or ventilator, the suction pipe of which is connected with a heating chamber 5, while its pressure or blower pipe 4 is connected with chamber 1. 6 is a smoke producing furnace connected with the suction pipe of fan 3. The chamber 1 is provided with a roof 7, having small openings 8 evenly distributed over its whole area, and connecting chamber 1 with another chamber 10, which is again connected by means of openings 11 and pipe 13 with the heat battery 5.

The total cross sectional area of openings 8 is so determined that a pressure a little above the atmospheric is always maintained in chamber 1.

A throttle valve 12 is provided for controlling passage 11, 13. Roof 8 is also provided with holes 14 connected by means of pipes 15 with channels 16 leading to a channel 17 with an outlet 18 to a chimney. Opening 18 is controlled by means of slide valve or the like 19.

The plant operates in the following manner: After the goods to be dried have been introduced in chamber 1, the door 2 of same is closed and the fan is started, drawing hot air from the battery 5. The hot air passes upward through chamber 1 and leaves the same partly through openings 8 and partly through channel 15. The part leaving through openings 8 reënters the chamber through channel 13 and the heat battery 5, while the other part is expelled. The relation between the air passing to the chimney and the air retained in circulation is controlled by means of valves 12, 19.

If smoking is desired, the smoking furnace 6 is started, and the combustion gases therefore pass into the fan through its connection tube 9. If smoking alone is desired, the heating battery is not put in operation, while otherwise the process is driven in the manner above described.

Claims:

1. In an apparatus or plant for smoking and drying fish or the like a smoking and drying chamber, a heating chamber, and a smoking furnace, connected in parallel with said smoking and drying chamber, a fan or ventilator for introducing smoke and hot air from said heating chamber and furnace into the smoking and drying chamber, a number of small outlet openings for smoke and hot air evenly distributed over the roof of said smoking and drying chamber, the total cross sectional area of the outlet openings being so determined that a pressure slightly above the normal is maintained in the smoking and drying chamber during the process.

2. In an apparatus or plant for smoking and drying fish or the like a smoking and drying chamber, a heating chamber, and a smoking furnace, connected in parallel with said smoking and drying chamber, a fan or ventilator for introducing smoke and hot air from said heating chamber and furnace into the smoking and drying chamber, an auxiliary chamber above the smoking and drying chamber connected therewith by a number of small outlet openings for smoke and hot air evenly distributed over the roof of said smoking and drying chamber, the said auxiliary chamber being also connected by means of a valve controlled conduit with the fan or ventilator.

3. In an apparatus or plant for smoking or drying fish or the like a smoking and drying chamber, a heating chamber, and a smoking furnace, connected in parallel with said smoking and drying chamber, a fan or ventilator for introducing smoke and hot air from said heating chamber and furnace into the smoking and drying chamber, a number of small outlet openings for smoke and hot air evenly distributed over the roof of said smoking and drying chamber, said openings communicating with a return conduit to the fan or ventilator and channels leading from the said roof to a valve controlled conduit communicating with a chimney.

In testimony that I claim the foregoing as my invention, I have signed my name in presence of two subscribing witnesses.

TORVALD GITLESEN NORLAND.

Witnesses:
J. LEE SCHAATHIM,
S. SELAND.